United States Patent Office 3,147,636
Patented Sept. 8, 1964

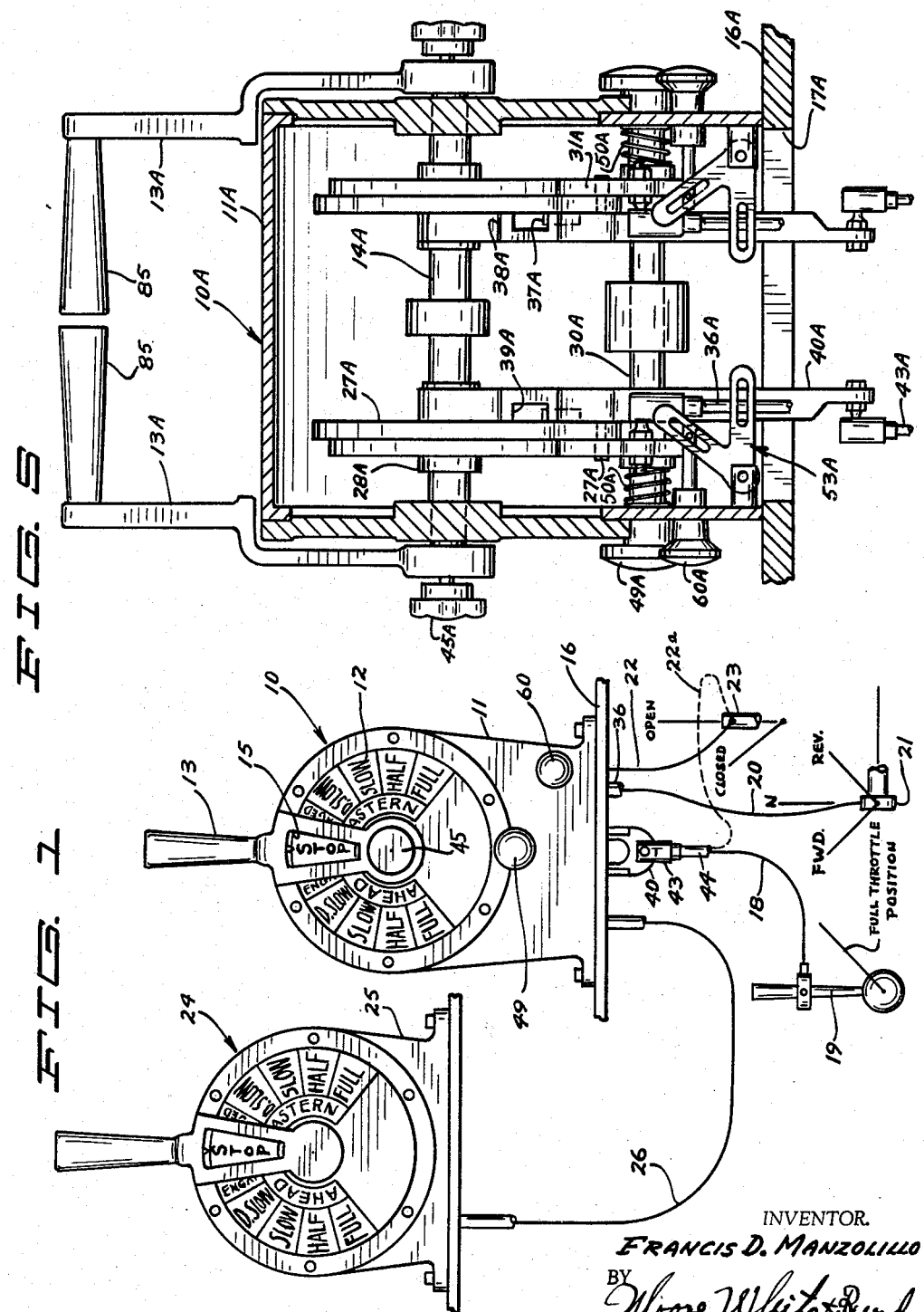

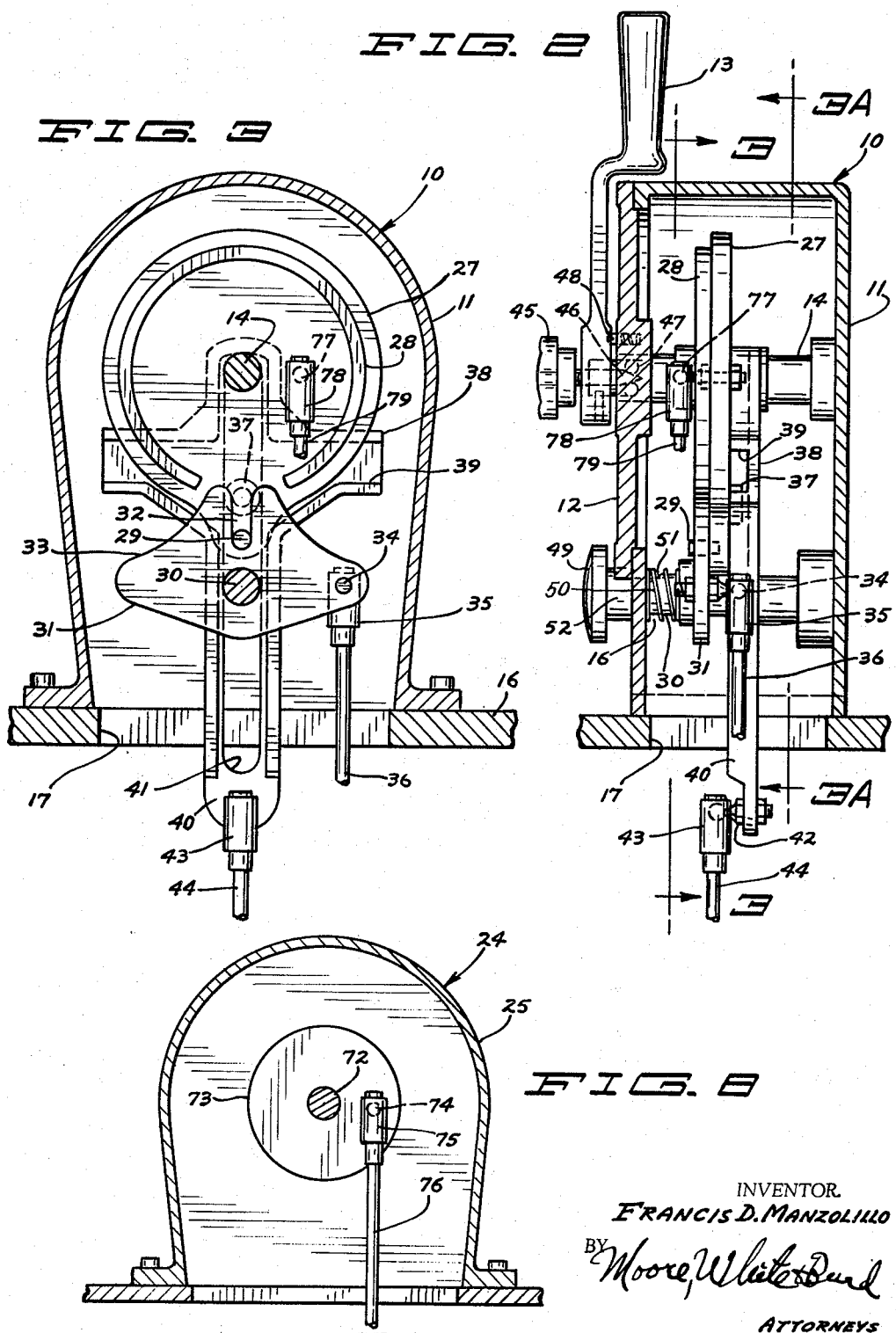

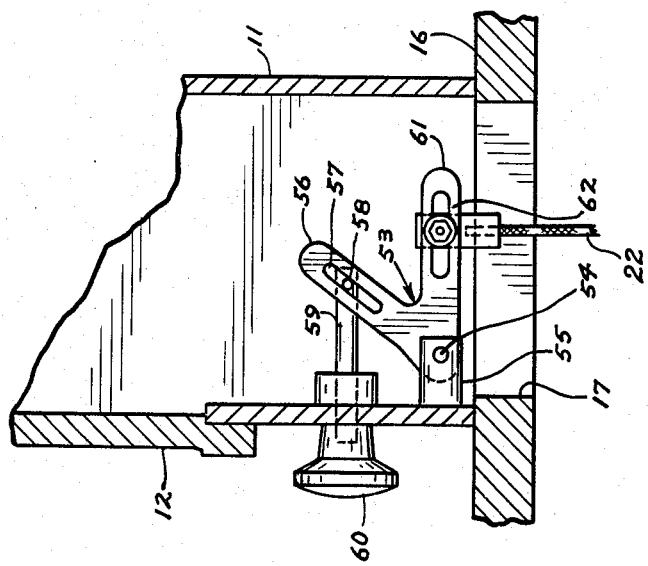

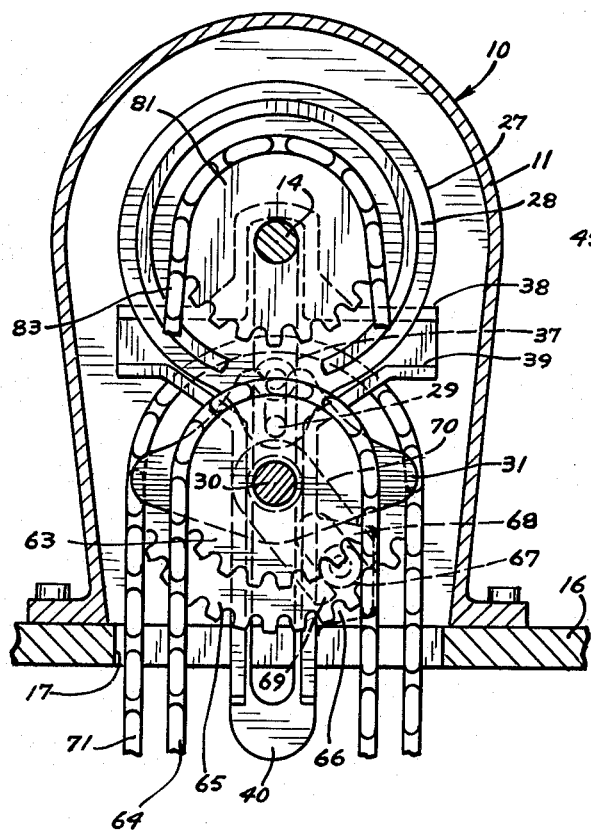

3,147,636
MARINE ENGINE CONTROL
Francis D. Manzolillo, 1116 N. Parkside Drive,
Peoria, Ill.
Filed July 23, 1962, Ser. No. 211,640
16 Claims. (Cl. 74—472)

This invention relates to control mechanisms for operating the usual throttle and clutches of a combined marine engine and reverse gear mechanism. More particularly this invention relates to a single lever pilot house throttle and marine gear control operative through a series of cams. The control of the present invention is simple in design, but rugged in construction. It is designed for use on all types of marine throttles and hydraulic reverse gears such as used on tugs, ferryboats, trawlers, dredges, work boats, pleasure crafts, military crafts, etc.

The invention is illustrated in the accompanying drawings in which like numerals are used to designate corresponding parts and in which:

FIGURE 1 is a schematic drawing showing in diagrammatic form connections between a top house control, pilot house control and engine throttle and hydraulic marine gear;

FIGURE 2 is a transverse vertical section through a pilot house control according to the present invention;

FIGURE 3 is a longitudinal vertical section generally on the line 3—3 of FIGURE 2 and in the direction of the arrows;

FIGURE 3A is a similar longitudinal vertical section generally on the line 3A—3A of FIGURE 2 and in the direction of the arrows;

FIGURE 4 is a transverse vertical section showing a detail of an engine shutdown lever comprising part of the control;

FIGURE 5 is a transverse vertical section through a pilot house control modified and adapted for control of dual marine engines and gears for either simultaneous or independent control of dual marine engines;

FIGURE 6 is a transverse vertical section through a modified form of single engine marine pilot house control showing different connecting means;

FIGURE 7 is a longitudinal section on the line 7—7 of FIGURE 6 and in the direction of the arrows;

FIGURE 8 is a longitudinal section through a single engine top house control showing a push-pull rod or cable type connection; and FIGURE 9 is a longitudinal section through a modified form of top house showing a chain and sprocket type connection.

Referring to the drawings, in FIGURE 1 there is shown schematically the general relationship between a pilot house control device, a top house control device and components of the marine engine actuated thereby. The pilot house control, indicated generally at 10, includes a housing 1. All of the components of the control are desirably composed of non-magnetic material so as not to have an effect on the compass in order to eliminate the need for compass compensation. The housing is provided on one side with a quadrant dial face plate 12, which is desirably formed of a light transmitting material in order that it may be illuminated for easy reading. The dial face is divided into segments bearing legends corresponding to desired engine actions.

The pilot house control is provided with a control lever 13 which is secured to rotate with a shaft 14 which is journaled to rotate in the housing and has one end extending out through the dial face to which end the lever is secured. Lever 13 extends beyond the pilot house control housing for easy manual manipulation and is provided with an opening 15 in the area of the dial face in order that the descriptive legend for the operating condition of the marine engine at any given lever position is read through the opening.

The pilot housing is mounted on the top of a base or pedestal 16 provided with a suitable opening 17 through which mechanical connections between the control device and the engine extend. The pilot house control is connected through conventional mechanical connections and linkages of the type used for linking marine engines with remote control devices, as well understood in the art, and indicated schematically at 18 for the connection between the pilot house control and engine throttle 19, at 20 to indicate the connection between the pilot house control and hydraulic gear 21, at 22 to indicate the connection between the pilot house control and engine shutdown means 23 and at 22a to indicate a safety connection to the engine shutdown means to prevent accidental engine shutdown.

Where required, multi-point control may be provided. For example, a top house control 24 having a housing 25 and a dial and lever, as already described in connection with the pilot house control, is linked mechanically with the pilot house control, as indicated schematically at 26, and described in greater detail hereinafter. Movements of the lever of the top house control result in corresponding movement of the lever of the pilot house control in order to effect corresponding operation of the marine engine.

The main control cam 27, having a raised circular cam track 28 and a cam follower 29 on the same face, is mounted within the pilot house control housing for rotation with shaft 14. Cam follower 29 projects from the face of the cam. A further shaft 30 is journaled for rotation in the pilot house housing directly below shaft 14. A rocker clutch cam 31 is secured to rotate with shaft 30. Clutch cam 31 is provided with an indentation 32 in which cam follower 29 is received to cause rotation of the cam and a pair of arcuate edges which are engaged by the cam track 28 of cam 27 to permit the clutch cam 31 to remain static during certain phases of rotation of cam 27.

When lever 13 is rotated in either the astern or ahead position the cam 27 secured to shaft 14 rotates an equivalent amount. During the first phase of rotation, that is from 0° to 20°, the hydraulic marine gear is engaged in the forward or reverse position depending upon the direction of rotation of the lever. Cam follower 29 engages clutch cam 31 in indentation 32 and the clutch cam is caused to rotate on its own axis, that is, the axis of shaft 30 only 0° to 20° in either direction. Rotation of the clutch gear beyond 20° in either direction is prevented by virtue of the arcuate cam edges 33 engaging the circular raised cam track 28 which causes the clutch cam to remain in the same position in spite of further rotation of the lever 13 and cam 27.

A ball joint member 34 is secured to one face of clutch cam 31 adjacent the end of one of the arms thereof. A connector 35 is attached thereto which serves as the terminal of a clutch push-pull rod or cable 36 which is connected to shift the hydraulic marine gear from neutral into forward or reverse as the eccentrically mounted ball joint is moved through an arc as the clutch cam 31 is rotated.

Cam 27 is provided with a further cam follower 37 on the opposite face of the cam from cam track 28 and cam follower 29. A throttle crosshead 38 is engaged by the cam follower 37. Cam follower 37 is in the form of a roller. Upon rotation of the cam 27 the cam follower 37 engages the inside edge of a raised cam track 39 of the throttle crosshead 38. The throttle crosshead has an elongated downwardly depending portion 40. A longitudinal slot 41 extends the length of the throttle crosshead engaging shafts 14 and 30. Movement of the throttle crosshead in response to engagement with the cam follower 37 is thus limited to a straight line direction.

As the lever 13 is rotated in either direction from 30 to 90° the throttle crosshead is moved in a straight line. Through means of a ball joint 42 at the bottom extremity of the throttle crosshead and a connector 43 which serves as a terminal for a push-pull rod or cable 44, the throttle of the engine is moved from idle position to full throttle position as the lever 13 is rotated from 30° to 90°.

When the control lever 13 is rotated in either direction from 20° to 30° the internal mechanism of the control, other than the cam 27 remains in a static position. This momentary time delay is built into the control to allow the propeller to come to rest when going from forward to reverse, or vice versa, as a protection to the marine gear and tailshaft assembly.

The throttle can be locked in any position by turning the knob 45. A pointed or tapered screw 46 which is part of the knob forces balls 47 outwardly against the bearing sleeve to create enough friction to maintain the throttle in a locked position. The throttle can thus be locked in position when using an automatic pilot or to hold the throttle in a steady position on installations where there is a possibility of creep due to vibration or surge action in the engine throttle. A spring loaded ball detent 48 indicates to the operator when he is in a stop (neutral) position or when the gear is engaged in the forward or reverse positions.

The clutch mechanism may be disconnected from the system by pulling the knob 49 and shaft 30 outwardly against the pressure of spring 50 a distance greater than the length of cam follower 29 so as to disengage the cam follower 29 from the clutch cam 31. A portion of shaft 30 is cut away to provide a fixed stop at 51. Rotation of the knob 49 then causes its hub 52 to rest against the edge of the pilot house dial face plate 12 to maintain the clutch cam 31 out of engagement with cam follower 29. This may be done by rotating knob 49 in either direction, either to the right or to the left. In this manner, the clutch mechanism may be bypassed and remain in a static position during the throttling operation. The clutch is disconnected to allow for engine warmup, engine testing, for powering auxiliary equipment such as a bilge pump or winch, etc.

Means are provided on the pilot house control for shutting down the marine engine. A crank arm link or lever 53 is pivotally and eccentrically mounted at 54 in a bracket 55 extending into the housing 11 out of the way of the other control mechanism. One arm 56 of the link means 53 is provided with a longitudinal slot 57 in which is fitted a pin 58 which extends from a longitudinally slidable shaft 59, which in turn extends through the housing wall to knob 60. The lower arm 61 of link 53 is similarly provided with a slot 62. A push-pull cable, such as an automatic choke type cable or wire rope, is adapted to be secured to arm 61 in slot 62 to provide a mechanical connection between the engine shut-down means and the link.

Simply pulling knob 60 causes pin 58 to move in slot 57 to pivot the link 53 to exert a pull on the mechanical connection with the engine shut-down to cut off the supply of fuel to the engine to shut down the engine. Accidental shutdown of the engine during operation is prevented by means of the connection shown schematically at 22a, when the control lever 13 is actuated, the throttle crosshead 38 is moved in a vertical direction. The upward movement of the crosshead and its downwardly depending portion 40 is transmitted through the connection shown schematically at 22a to pull taut the cable attached to the engine shut-down 23 to prevent improper movement of the engine shut-down.

In FIGURES 6 and 7 there is shown a modified form of pilot house control provided with sprocket and chain connecting means for transmitting movement of the control lever to the marine engine. The construction of the housing, dial face plate, lever, control cam 27, clutch cam 31, throttle crosshead 38, etc., are as already described. When lever 13 is rotated in either the astern or ahead position the cam 27 is rotated an equivalent amount and during the first phase of rotation from 0° to 20° the hydraulic marine gear is engaged in the forward and reverse position, depending upon the rotation of the lever 13, by the action of the clutch cam 31.

As already described, the clutch cam 31 rotates on its own axis only from 0° to 20° in either direction actuated by cam follower 29 carried on cam 27. As the main cam 27 is rotated beyond 20° in either direction the clutch cam remains in static position. A sprocket 63 is secured to rotate with cam 31. Rotation of sprocket 63 is connected through a suitable chain drive 64 to actuate a corresponding sprocket on the hydraulic marine gear lever into the corresponding forward or reverse position.

As heretofore described, when the lever 13 is rotated in either direction from 20° to 30° the internal mechanism of the control, other than the cam 27, remains in static position. As the lever is rotated from 30° to 90° the cam follower 37 on the opposite side of cam 27 engages the raised cam surfaces 39 of the throttle crosshead 28. Because of the engagement of slot 41 of the throttle crosshead 38 by the shafts 30 and 14, movement of the throttle crosshead is limited to a straight line direction. This straight line action of the throttle crosshead 39 causes rotation of a throttle sprocket 65.

The downwardly extending portion 40 of the throttle crosshead 38 is provided with a laterally projecting extension 66 to which is affixed a cam follower 67. Cam follower 67 is in the form of a roller which rotates between the arms 68 and 69 of a bifurcated throttle cam 70. The throttle sprocket 65 is secured to throttle cam 70 to rotate therewith about shaft 30. Thus, as the throttle crosshead moves in a straight line direction in response to movement of the control lever 13 and cam 27, the throttle sprocket 65 is rotated. Throttle sprocket 65 is connected through means of chain 71 to actuate a sprocket on the engine throttle from idle position to full throttle position. The modified form of control device is provided with means for locking the throttle, for disconnecting the clutch mechanism and for shutting down the marine engine as already described.

For installations requiring multi-point control, such as a two point (top house and pilot house) control, a special top house control head is provided, as shown in FIGURE 8. The top house control, indicated generally at 24, includes a housing 25. A shaft 72 is journaled in the housing for rotation therein. A cam 73 is secured to rotate with the shaft. The cam is provided with a ball joint 74 to which is secured a connector 75 which serves as a terminal for a push-pull rod or cable 76. The pilot house control cam 27 is similarly provided with a ball joint 77 to which is attached a connector 78 which serves as a terminal for a push-pull cable 79.

The top house control is provided with a face plate and lever corresponding to the same parts of the pilot house control. Cables 76 and 79 are mechanically interconnected, as well understood in the art, so that movement of the lever of the pilot house of the top house control causes corresponding movement of the lever and cam of the pilot house control to actuate the marine engine for hydraulic gear.

In FIGURE 9, there is shown a modified form of top house control adapted for remote control of the modified pilot house control of FIGURES 6 and 7. In this modified form of top house control, a sprocket 80 is secured to rotate with shaft 72 in response to movement of the top house control lever. Rotation of sprocket 80 causes corresponding rotation of a sprocket 81 which is secured to rotate with cam 27 of the pilot house control. The sprockets 80 and 81 are mechanically interconnected through means of sprocket chains 82 and 83, as well understood in the art, so that rotation of the top house lever causes corresponding rotation of the pilot house lever and pilot house control cam to actuate the marine engine or hydraulic gear.

For installations requiring more than one engine, a pair of single engine controls are combined in one case to form a dual control, as shown in FIGURE 5. The parts of the dual control correspond generally to the parts of the form of control shown in FIGURES 2, 3 and 3A and are similarly designated. The levers 13A are each provided with an inwardly extending handle 85, both of which may be grasped simultaneously to actuate two engines simultaneously. Shafts 14A and 30A are independently journaled to permit independent actuation of two engines by separate grasping of levers 13A. The dual control is obviously adaptable to the use of sprocket and chain connecting means. The dual control is obviously also adaptable to multi-point installation.

As a convenience to purchasers, and to increase the versatility of the control of the present invention, means may be incorporated into a single unit adapting it for both sprocket chain and push-pull cable linkage with the engine and hydraulic gear. For example, clutch cam 31 may be adapted to receive a ball joint connector means and at the same time be filled with a sprocket, giving the purchaser an option as to which form of linkage shall be used.

The marine control of the present invention is characterized by a combined clutch and throttle control which forces the operator or helmsman to execute all clutch and throttle maneuvers in correct sequence, thus preventing a careless, excited or inexperienced operator or helmsman from damaging the marine gear propeller shafts and bearings due to an erratic maneuver. The control is 100% foolproof. It is absolutely impossible to engage or disengage the clutches when the engine is at any speed other than idle.

The means for disconnecting the clutch from the pilot house enables the operator to move the throttle from idle to full throttle for starting, warming up, powering auxiliary equipment such as bilge pumps, hoists, charging the generator, adjusting the engine, etc., with absolutely no possibility of intentional or accidental engagement of the clutch. The engine can be shut down from the pilot house. Maneuvers from full astern to full ahead can be made without fear of damage to the marine gear and propeller shaft assembly. Detents are provided for positioning neutral, as well as forward and reverse positions.

It is impossible to have a partial clutch engagement. The operator must automatically execute the proper sequence of movements. The control is adapted to be made fungus proof for operation in tropical areas. The control may be lubricated for its lifetime so as to require no maintenance or adjustment. In the embodiment of the control employing push-pull cable connections, quick disconnect ball joints are used. This enables the pilot house control to be quickly disconnected in the engine room without disturbing the original installation by merely pushing down on the disconnect sleeve and releasing the ball joint.

The control according to the present invention provides the only fully mechanical pilot house control permitting instant regulation of engine speed and direction from the pilot house or auxiliary control point.

An added feature of the present invention is that the engine can be started in the engine room and the throttle can be actuated in the engine room when using push-pull cable connections without disturbing the original installation. For example, referring to FIGURE 1, when the throttle lever 19 is moved toward the right to full throttle position the push-pull cable connection 18 is moved to the right. Throttle crossarm 38 is free to move in a vertical direction without engagement with the rocker clutch cam 31 and will not under any circumstances cause the marine gear to engage. The engine can be started and operated in the engine room eliminating the necessity of having someone in the pilot house when testing the engine, etc.

The engine can also be shut down in the engine room without disturbing the original installation. This is an advantage, especially on small crafts during maintenance, as it is difficult to communicate between pilot house and engine room on small crafts, and it eliminates the necessity of one person remaining in the pilot house, freeing him to assist in the engine room.

It is apparent that many modifications and variations of the invention as hereinbefore set forth may be made without departing from the spirit and scope thereof. The specific embodiments described are given by way of example only and the invention is limited only by the terms of the append claims.

I claim:

1. A control mechanism for operating the clutch and throttle of a marine engine, said control mechanism comprising a control cam mounted for rotation about an axis, a control lever mounted to rotate said control cam, a first and second cam follower on said control cam, a clutch cam mounted for rotation about an axis spaced from and parallel to the axis of rotation of said control cam, said clutch cam being so contoured as to engage said first cam follower only upon initial rotation of said control lever from neutral position in either direction and to disengage said first cam follower and remain static upon further rotation of said control lever, a throttle crosshead cam mounted for movement in a straight line direction perpendicular to the axes of rotation of said control cam and clutch cam, said throttle cam being so contoured as to engage said second cam follower only upon further rotation of said control lever in either direction after disengagement of said first cam follower by said clutch cam, linkage means adapted to connect said clutch cam to the clutch of a marine engine and linkage means adapted to connect said throttle cam with the engine throttle.

2. A control mechanism according to claim 1 further characterized in that said first and second cam followers are on opposite faces of said control cam.

3. A control mechanism according to claim 1 further characterized in that control cam is provided with a raised partial circular cam track on the same face as said first cam follower and said clutch cam is provided with arcuate edges to engage said circular cam track in sliding relation to maintain said clutch cam in static position through part of the rotation of said control cam after disengagement of the first cam follower by the clutch cam.

4. A control mechanism according to claim 1 further characterized in that said linkage means comprises sprockets movable in response to movement of said clutch cam and throttle crosshead cam and chains driven by said sprockets.

5. A control mechanism according to claim 4 further characterized in that said throttle crosshead cam includes an elongated portion having a projecting extension and a cam follower on said extension, a bifurcated throttle cam is mounted for rotation about the axis of rotation of said clutch cam, the arms of said bifurcated throttle cam engage said cam follower on the throttle crosshead extension and a sprocket is secured to rotate with said bifurcated cam.

6. A control mechanism for operating the clutch and throttle of a marine engine, said control mechanism comprising a housing, a first shaft in said housing journaled for rotation relative thereto, a control lever secured to said shaft to rotate the same, a control cam on said shaft secured to rotate therewith, a second shaft in said housing journaled for rotation relative thereto, said second shaft being parallel to and spaced from said first shaft, a clutch cam on said second shaft secured to rotate therewith, a first cam follower on said control cam, said clutch cam being contoured so as to engage said first cam follower only upon initial rotation of said control lever from vertical in either direction and to disengage said first cam follower and remain static upon further rotation of said control lever, a throttle crosshead cam, a second cam follower on said control cam, said throttle cam being contoured so as to engage said second cam follower only upon further rotation of said control lever from vertical in either direction after disengagement of said first cam follower by said clutch cam, said throttle cam being slotted and engaging both of said shafts to limit movement of the throttle cam to a straight line direction, linkage means adapted to connect said clutch cam to the clutch of a marine engine to render the clutch operable to drive the propeller shaft in either direction, and linkage means adapted to connect said throttle cam with the engine throttle to operate said engine from idle to full speed.

7. A control mechanism according to claim 6 further characterized in that said first and second cam followers are on opposite faces of said control cam.

8. A control mechanism according to claim 7 further characterized in that control cam is provided with a raised partial circular cam track on the same face as said first cam follower and said clutch cam is provided with arcuate edges to engage said circular cam track in sliding relation to maintain said clutch cam in static position through part of the rotation of said control cam after disengagement of the first cam follower by the clutch cam.

9. A control mechanism according to claim 6 further characterized in that said linkage means comprises sprockets movable in response to movement of said clutch cam and throttle crosshead cam and chains driven by said sprockets.

10. A control mechanism according to claim 9 further characterized in that said throttle crosshead cam includes an elongated portion having a projecting extension and a cam follower on said extension, a bifurcated throttle cam is mounted for rotation about said second shaft, the arms of said bifurcated throttle cam engage said cam follower on the throttle crosshead extension and a sprocket is secured to rotate with said bifurcated cam.

11. A control mechanism according to claim 6 further characterized in that said second shaft is slidable longitudinally along its axis to disengage said clutch cam from said control cam and means are provided to lock said second shaft to maintain said cams in disengaged relation.

12. A control mechanism according to claim 6 further characterized by the provision within said housing of a crank arm mounted for pivotal movement, means external of said housing for actuating said crank arm and linkage means adapted to connect said crank arm to cut off the supply of fuel to said engine to effect engine shut down.

13. A control mechanism for operating the clutch and throttle of a marine engine, said control mechanism comprising a housing, a first shaft in said housing journaled for rotation relative thereto, a control lever secured to said shaft to rotate the same, a control cam on said shaft to rotate therewith in a plane perpendicular to the longitudinal axis of said shaft, a first cam follower and raised partial circular cam track on one face of said control cam and a second cam follower on the opposite face of said control cam, a second shaft in said housing journaled for rotation relative thereto, said second shaft being parallel to and spaced from said first shaft, a clutch cam on said second shaft secured to rotate therewith in a plane parallel to and adjacent to the plane of rotation of said control cam, said clutch cam being contoured so as to engage said first cam follower only upon initial rotation of said control lever from normal vertical in either direction and to disengage said first cam follower upon further rotation of said control lever, said clutch cam being provided with arcuate edges to engage said circular cam track of said control cam in sliding relation to maintain said clutch cam in static position through that part of the rotation of said control lever after disengagement of the first cam follower by the clutch cam, a throttle crosshead cam movable in a plane parallel to and adjacent to the plane of rotation of said control cam, said throttle cam being slotted and engaging both of said shafts to limit movement of the throttle cam to a straight line direction, said throttle cam being contoured so as to engage said second cam follower only upon further rotation of said control lever from normal vertical in either direction after disengagement of said first cam follower by said clutch cam, linkage means adapted to connect said clutch cam to the clutch of a marine engine and linkage means adapted to connect said throttle cam with the engine throttle.

14. A control mechanism according to claim 13 further characterized in that said linkage means comprised sprockets movable in response to movement of said clutch cam and throttle crosshead cam and chains driven by said sprockets.

15. A control mechanism according to claim 14 further characterized in that said throttle crosshead cam includes an elongated portion having a projecting extension and a cam follower on said extension, a bifurcated throttle cam is mounted for rotation about said second shaft, the arms of said bifurcated throttle cam engage said cam follower on the throttle crosshead extension and a sprocket is secured to rotate with said bifurcated cam.

16. A control mechanism according to claim 13 further characterized by the presence of a remote control actuating means, said remote control actuating means comprising a housing, a shaft in said housing journaled for rotation relative thereto, a control lever secured to said shaft to rotate the same, means on said shaft secured to rotate therewith, and eccentrically mounted linkage means thereon mechanically interconnected with the control cam of said control mechanism whereby rotation of the control lever of said remote control actuating device causes a corresponding rotation of the control cam, first shaft and control lever of said control mechanism.

References Cited in the file of this patent

UNITED STATES PATENTS

| | | |
|---|---|---|
| 2,729,984 | Morse | Jan. 10, 1956 |
| 2,907,421 | Morse et al. | Oct. 6, 1959 |